United States Patent [19]

Burroway et al.

[11] Patent Number: 5,268,431
[45] Date of Patent: Dec. 7, 1993

[54] METHOD FOR PREPARING ULTRA-LOW MOLECULAR WEIGHT TONER RESIN

[75] Inventors: Gary L. Burroway, Doylestown; Dane K. Parker, Massillon; James R. Purdon, Jr., Stow, all of Ohio

[73] Assignee: The Goodyear Tire & Rubber Company, Akron, Ohio

[21] Appl. No.: 952,091

[22] Filed: Sep. 28, 1992

[51] Int. Cl.$^5$ ............... C08F 8/06; C08F 6/14
[52] U.S. Cl. ................ 525/333.8; 525/330.3; 525/331.9; 525/332.8; 525/332.9; 525/331.1; 525/333.3; 528/483; 528/490
[58] Field of Search ............ 525/333.8, 331.9; 528/483, 490

[56] References Cited

U.S. PATENT DOCUMENTS

| | | | |
|---|---|---|---|
| 3,069,382 | 12/1962 | Nikolov et al. | 260/45.5 |
| 3,960,980 | 6/1976 | Yukuta | 525/113 |
| 3,978,154 | 8/1976 | Yukuta | 525/112 |
| 4,026,928 | 5/1977 | Chaudhary | 562/408 |
| 4,868,259 | 9/1989 | Burroway et al. | 526/203 |
| 5,039,737 | 8/1991 | Parker | 524/804 |

FOREIGN PATENT DOCUMENTS 884448 12/1961 United Kingdom.

OTHER PUBLICATIONS

F. W. Billmeyer, Jr., "Textbook of Polymer Science", 3rd Ed., 141, (1984) Wiley (New York).
J. March, Advanced Organic Chemistry: Reactions, Mechanisms and Structure; pp. 871–874 (McGraw-Hill Book Company, 1968).
R. T. Morrison and R. N. Boyd, Organic Chemistry; Third Edition; pp. 218–219 (Allyn and Bacon, Inc., 1973).

Primary Examiner—Joseph L. Schofer
Assistant Examiner—Fred Zitomer
Attorney, Agent, or Firm—Alvin T. Rockhill

[57] ABSTRACT

Very low molecular weight polymers are sometimes used in toners which are designed for high speed printers and copiers. It is extremely difficult to prepare polymers having the ultra-low molecular weights required in such applications by standard emulsion polymerization techniques. By utilizing the techniques of this invention, the molecular weight of polymers made by conventional emulsion polymerization can be reduced to a very low level. This invention more specifically discloses a process for preparing a low molecular weight polymer which is particularly useful as a toner resin, which comprises (1) treating an emulsion of a polymer having a number average molecular weight which is within the range of about 18,000 to about 40,000 and which is comprised of repeat units which are derived from about 65 to about 95 weight percent of a vinyl aromatic monomer, from about 1 to about 12 weight percent of a conjugated diene monomer, and optionally from about 1 to about 34 weight percent of an alkyl acrylate monomer, with ozone in an amount and under conditions which are sufficient to reduce the number average molecular weight of the polymer to within the range of about 3,000 to about 15,000; and (2) recovering the polymer from the emulsion.

17 Claims, No Drawings

METHOD FOR PREPARING ULTRA-LOW MOLECULAR WEIGHT TONER RESIN

BACKGROUND OF THE INVENTION

Resins having extremely low molecular weights are sometimes used in toners for high speed printers and copiers. Such ultra-low molecular weight resins are typically blended with resins of much higher molecular weights to provide desired characteristics. For instance, the ultra-low molecular weight resin in the blend provides for good fusion and flow characteristics at the temperatures encountered in the copier or printer. They also fuse and melt very quickly after being heated which is extremely important since in high speed operations, it is essential for them to fuse and flow very quickly. On the other hand, polymers having number average molecular weights of 200,000 to 300,000 are typically included in such blends to prevent the toner resin from being too sticky. In some cases, polymers of extremely low molecular weights and intermediate molecular weights and a high molecular weight are blended to make toners having the characteristics desired.

It is extremely difficult to make the ultra-low molecular weight polymers needed in such toner applications by standard emulsion polymerization techniques. The molecular weight of polymers produced by free radical emulsion polymerization decreases as the amount of initiator utilized in the polymerization is increased. However, as the amount of initiator used is increased to higher and higher levels, the resulting polymerization reaction becomes increasingly more difficult to control. The reaction also proceeds very rapidly at very high levels of initiator making temperature control very difficult. For these reasons, it is not practical to utilize an initiator level of greater than about 0.6 phm (parts per hundred parts by weight of monomer). Chain transfer agents can also be used to reduce the molecular weight of polymers made by free radical emulsion polymerization. However, the extent to which chain transfer agents can reduce the molecular weight of the polymer is limited. For instance, chain transfer agents typically result in a maximum molecular weight reduction when used at a level of about 2.5 phm. The use of higher levels of chain transfer agents typically does not result in further molecular weight reduction. Furthermore, the use of chain transfer agents in large amounts can lead to other problems, such as undesirable odors. For these reasons, toner resins having number average molecular weights of less than about 18,000 are virtually impossible to make by free radical emulsion polymerization.

It is known that carbon-to-carbon double bonds in organic compounds can be cleaved by ozonylsis. The reaction through which ozone cleaves the double bonds in organic compounds can be depicted as follows:

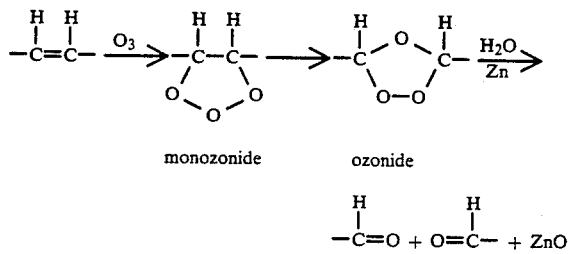

monozonide    ozonide

In the absence of zinc, hydrogen peroxide is formed which may degrade the carbonyl products formed by oxidation. In such a scenario, the hydrogen peroxide reacts with the aldehydes produced by ozonylsis and converts them to carboxylic acids. A more detailed description of ozonolysis is provided by J. March, Advanced Organic Chemistry: Reactions, Mechanisms and Structure; pages 871-874 (McGraw-Hill Book Company, 1968) and by R. T. Morrison and R. N. Boyd, Organic Chemistry; Third Edition; pages 218-219 (Allyn and Bacon, Inc., 1973). U.S. Pat. No. 5,039,737 discloses that ozone can be used to reduce the level of residual hydrazine in latices.

SUMMARY OF THE INVENTION

By utilizing the technique of this invention, ultra-low molecular weight polymers which are particularly useful as toner resins can be prepared by free radical emulsion polymerization. In this technique, a polymer having a relatively low molecular weight within the range of about 18,000 to about 40,000 is produced by free radical emulsion polymerization. The emulsion prepared is then treated with ozone which cleaves double bonds within the polymer. This ozonolysis reaction reduces the number average molecular weight of the polymer in the latex to within the desired range of about 3,000 to about 18,000. This ozone treatment can be accomplished by simply adding ozone to the latex, such as by bubbling the ozone through the latex.

This invention more specifically discloses a process for preparing a low molecular weight polymer which is particularly useful as a toner resin, which comprises (1) treating an emulsion of a polymer having a number average molecular weight which is within the range of about 18,000 to about 60,000 and which is comprised of repeat units which are derived from about 65 to about 95 weight percent of a vinyl aromatic monomer, from about 1 to about 12 weight percent of a conjugated diene monomer, and optionally from about 1 to about 34 weight percent of an alkyl acrylate monomer, with ozone in an amount and under conditions which are sufficient to reduce the number average molecular weight of the polymer to within the range of about 3,000 to about 15,000; and (2) recovering the polymer from the emulsion.

DETAILED DESCRIPTION OF THE INVENTION

The polymers which are treated with ozone in accordance with this invention have an original molecular weight which is within the range of about 18,000 to about 60,000. The number average molecular weight of the polymers treated in accordance with this invention is more typically within the range of about 20,000 to about 30,000. These polymers are comprised of repeat units which are derived from about 65 to about 95 weight percent styrene, from about 1 to about 12 weight percent conjugated diene monomers, and optionally, from about 1 to about 34 weight percent of an alkyl acrylate monomer.

The conjugated diene monomer will typically be either 1,3-butadiene or isoprene monomer. Generally, any vinyl aromatic monomer which is known to polymerize in free radical systems can be used. Such vinyl aromatic monomers typically contain from 8 to 20 carbon atoms. Usually, the vinyl aromatic monomer will contain from 8 to 14 carbon atoms. Some representative examples of vinyl aromatic monomers that can be utilized include styrene, 1-vinyl napthalene, 2-vinyl napthalene, 3-methyl styrene, 4-propyl styrene, 4-cyclohexyl styrene, 4-dodecyl styrene, 2-ethyl-4-benzyl styrene, 4-(phenylbutyl) styrene and the like. Styrene is generally the preferred vinyl aromatic monomer.

The alkyl acrylate monomers that can be used generally have the structural formula:

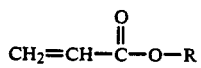

wherein R represents an alkyl group containing from 1 to 10 carbon atoms. The alkyl group in such alkyl acrylate monomers will preferably contain from 2 to 8 carbon atoms with alkyl groups which contain 4 carbon atoms being most preferred. Accordingly, ethyl acrylate, propyl acrylate, butyl acrylate, pentyl acrylate, hexyl acrylate, and 2-ethyl hexyl acrylate are preferred alkyl acrylate monomers with butyl acrylate being the most preferred. The alkyl groups in such alkyl acrylate monomers can be straight chained or branched. Thus, normal-propyl acrylate, isopropyl acrylate, normal butyl acrylate, or tertiary-butyl acrylate can be employed. Normal-butyl acrylate is a particularly preferred monomer.

One particularly preferred polymer for utilization in toner resins is comprised of about 65 weight percent to about 90 weight percent vinyl aromatic monomers, from about 5 weight percent to about 34 weight percent alkyl acrylate monomers, and from about 1 weight percent to about 5 weight percent conjugated diene monomers. It is particularly preferred for this polymer to contain from about 70 weight percent to about 80 weight percent vinyl aromatic monomers, from about 16 weight percent to about 28 weight percent alkyl acrylate monomers, and from about 2 weight percent to about 4 weight percent conjugated diene monomers. It is also preferred for the vinyl aromatic monomer to be styrene, for the alkyl acrylate monomer to be n-butyl acrylate and for the conjugated diene monomer to be 1,3.butadiene in these polymers.

Another highly preferred polymer which can be utilized as the low molecular weight component in toner resin blends is comprised of about 85 weight percent to about 95 weight percent vinyl aromatic monomers and from about 5 weight percent to about 15 weight percent conjugated diene monomers. It is more preferred for such polymers to contain from about 88 weight percent to about 92 weight percent vinyl aromatic monomers and from about 8 weight percent to about 12 weight percent conjugated diene monomers with the vinyl aromatic monomer being styrene and with the conjugated diene monomer being 1,3.butadiene. Such polymers will typically have glass transition temperatures which are within the range of about 40° C. to about 65° C. It is normally preferred for the polymer to have a glass transition temperature which is within the range of about 45° C. to about 60° C. As a general rule, higher levels of vinyl aromatic monomers result in higher glass transition temperatures. On the other hand, lower levels of vinyl aromatic monomers result in the polymer having lower glass transition temperatures. As a general rule, the glass transition temperature of the polymer should not be below about 40° C. because lower glass transition temperatures are indicative of polymers which are too soft for utilization in toner resin applications. The fusion and flow characteristics of the toner are compromised if the glass transition temperature of the toner resin is above about 65° C.

The polymer emulsions which are treated with ozone in accordance with this invention are prepared utilizing free radical emulsion polymerization techniques. Essentially any type of free radical generator can be used to initiate such free radical emulsion polymerizations. For example, free radical generating chemical compounds, ultra-violet light or radiation can be used. In order to ensure a satisfactory polymerization rate, uniformity, and a controllable polymerization, free radical generating chemical agents are generally used with good results. Some representative examples of free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy) cyclohexane, and the like. Persulfate initiators, such as potassium persulfate and ammonium persulfate are especially useful in such aqueous emulsion polymerizations. Generally from about 0.3 phm (parts per hundred parts of monomer) to about 0.6 phm of initiator will be utilized to produce a polymer having a number average molecular weight which is within the range of about 18,000 to about 60,000. In most cases about 0.45 to about 0.55 phm of a free radical initiator will be utilized. Preferably, about 0.5 phm of a free radical initiator will be employed.

To further reduce the molecular weight of the polymer, the emulsion polymerization will be conducted in the presence of one or more chain transfer agents. The chain transfer agent will typically be employed at a level which is within the range of 2.0 phm to about 2.5 phm. Alkyl mercaptans are particularly preferred for utilization as the chain transfer agent. Tertiary-dodecylmercaptan and normal-dodecylmercaptan are highly preferred with normal-dodecylmercaptan being the most highly preferred. Mercaptans having lower molecular weight alkyl groups cause dramatic reductions in molecular weight. However, the use of such low molecular weight mercaptans results in odor problems. For instance, toners made with resins prepared utilizing such low molecular weight mercaptans can give off very unpleasant odors when the toner resin is ultimately used in a copier. Higher molecular weight mercaptans typically do not cause odor problems. However, they are not very effective at reducing the molecular weight of the polymer being prepared by free radical emulsion polymerization. It is typically advantageous for the chain transfer agent to be added incrementally throughout the polymerization.

A wide variety of types of emulsifiers or surfactants can be utilized in the process of this invention. For instance, rosin acid or fatty acid emulsifiers can be utilized. However, synthetic surfactants are normally preferred. Salts of alkyl sulfates, alkyl sulfonates and alkyl phosphates are particularly preferred for utilization as emulsifiers. The alkyl groups in these compounds generally contain from 1 to 30 carbon atoms. Normally the alkyl groups in these surfactants will contain from 8 to 20 carbon atoms. The surfactant utilized will normally be a sodium, potassium, magnesium or ammonium salt. Sodium lauryl sulfate, ammonium lauryl sulfate, sodium dodecyl benzene sulfonate are some representative examples of highly suitable emulsifiers.

Generally from about 1 phm to about 6 phm of emulsifier is utilized in preparing the aqueous polymerization medium. It has been determined that the use of less than 1 phm of surfactant leads to latex instability. On the other hand the utilization of more than 6 phm of surfactant causes isolation problems. In most cases, it will be preferred to utilize from 2 phm to 4 phm of emulsifier. The precise amount of emulsifier required in order to attain optimal results will, of course, vary with the specific emulsifier being used and with the monomers and seed polymer being polymerized. However, persons skilled in the art will be able to easily ascertain the specific amount of emulsifier required in order to attain optimal results.

The free radical emulsion polymerization will typically be conducted at a temperature which is within the range of about 100° F. (39° C.) to about 185° F. (85° C.). It is generally preferred for the polymerization to be carried out at a temperature which is within the range of 125° F. (52° C.) to about 175° F. (74° C.). To increase conversion levels, it is typically advantageous to increase the temperature as the polymerization proceeds. For instance, the polymerization temperature could be maintained at about 125° F. (52° C.) at the beginning of the polymerization and increased to a final temperature of about 175° F. (74° C.) at the end of the polymerization.

The polymerization time required in order to carry out such free radical emulsion polymerization generally ranges between about 3 hours and about 12 hours. In most cases, the polymerization reaction can be completed in about 4 to about 8 hours.

In practicing the present invention, ozone is simply mixed with the latex for a period of time which is sufficient to attain the desired results. This can be accomplished by bubbling ozone through the latex. It can also be done by rapidly agitating the latex under an ozone containing atmosphere. It may be desirable for the ozone containing atmosphere to be under pressure. Other techniques for mixing ozone throughout the latex being treated can also be employed in practicing the present invention.

The temperature at which this treatment procedure is carried out is not critical. In fact, virtually any temperature between the freezing point of the latex and its boiling point can be utilized. However, for practical reasons, the latex will normally be treated with ozone at a temperature which is within the range of about 0° C. to about 60° C. A temperature within the range of about 15° C. to about 30° C. will most preferably be employed. Higher temperatures can result in reduced solubility of the ozone in the latex even though faster reaction rates may be attained. The ozone treatment will be carried out for a time which is sufficient to reduce the number average molecular weight of the polymer to within the range of 3,000 to 15,000. The number average molecular weight of the polymer will preferably be reduced to be within the range of 4,000 to 12,000 and will more preferably be reduced to be within the range of 5,000 to 10,000. The treatment time employed will typically be within the range of about 15 minutes to about 6 hours. The period of time utilized in treating the latex with ozone will more typically be within the range of about 30 minutes to about 2 hours.

If the ozonylsis is carried out in the absence of zinc, carboxyl groups will typically be formed. As the amount of carboxyl groups on the polymer increases, the pH of the emulsion decreases. The extent to which double bonds in the polymer have been cleaved can accordingly be monitored by monitoring the pH of the emulsion.

After the emulsion has been treated with ozone, the ultra-low molecular weight polymer therein can be recovered utilizing standard techniques. Conventional coagulation techniques, such as salt-acid coagulation procedures, can be employed. However, it should be noted that the latex stability generally improves with ozonation due to the generation of additional carboxylate-terminated soap like polymer fragments. This feature, although often desirable, will necessitate the use of additional coagulant, the amount of which will be dictated by the level of carboxylate generated.

This invention is illustrated by the following examples which are merely for the purpose of illustration and are not to be regarded as limiting the scope of the invention or the manner in which it can be practiced. Unless specifically indicated otherwise all parts and percentages are given by weight.

EXAMPLE 1

In this experiment, a polymer emulsion was treated with ozone to reduce the number average molecular weight therein. The polymer in the emulsion contained about 90 weight percent styrene, about 7 weight percent butyl acrylate and about 3 weight percent 1,3-butadiene. The emulsion had an initial pH of 9.60. A control was also run wherein the polymer in the emulsion contained about 90% styrene and 10% butyl acrylate (no conjugated diene monomers). The latices which were ozonated in this experiment had a solids content of 50%.

In the procedure used, 600 milliliters of the emulsion were placed in 2,000 milliliter beakers along with magnetic stir bars. Several drops of Dow DB.31 antifoam was added to the latices. The beaker and stirring apparatus were placed under a fume hood. A glass tube extending to the bottom of the stirred latex was then attached to the beaker. The outlet tube of a Welsbach Ozonator was then attached to the glass feed tube through an intervening dry trap. Oxygen gas was passed through the ozonator and into the latex at a rate of 3.5 liters per minute. The ozone content of the gas was measured to be 30.45 mg/l. The latices were subjected to the ozone treatment for a period of 4 hours. The latex was then removed from the apparatus and processed by conventional coagulation and drying techniques to obtain resin samples for testing.

The pH and melt flow index of samples recovered after various degrees of ozonolysis are reported in Table I

TABLE I

| Ozonation Level (g of $O_3$) | Control | | Butadiene Containing Polymer | |
|---|---|---|---|---|
| | pH | MFI* | pH | MFI* |
| none | 9.8 | 0.902 | 9.6 | 1.43 |

TABLE I-continued

| Ozonation Level | Control | | Butadiene Containing Polymer | |
|---|---|---|---|---|
| (g of O₃) | pH | MFI* | pH | MFI* |
| 4.6 | 8.9 | — | 9.0 | 15.1 |
| 10.3 | 7.8 | — | 8.2 | 129.5 |
| 19.9 | 6.2 | — | 6.4 | 600.5 |
| 37.0 | 5.1 | 0.25 | 5.5 | 636.5 |

*Melt Flow Index was measured with a Tinius Olsen Extrusion Plastometer using ASTM D1238-89 Procedure.

As can be seen the melt flow index of the butadiene containing polymer increased significantly with increasing levels of ozone treatment. The control which did not contain double bonds showed a decrease in flow which may be attributed to peroxide or perester cross-linking. The final sample taken did not show much change in melt flow index which indicates that most of the double bonds in the polymer had already been cleaved by earlier treatment. The pH of the latices dropped throughout the ozone treatment procedures. This example shows that the technique of this invention is a viable means for increasing the melt flow index of toner resins.

In another experiment, a high styrene containing resin copolymer containing 1,3.butadiene as one of its monomeric components was treated with ozone as described above to reduce the molecular weight of the polymer. This treatment with ozone cleaved the polymer at double bonds in repeat units which were derived from 1,3.butadiene monomer. Table II shows various properties of the resin recovered after ozonolysis as compared to those of a control.

TABLE II

| | Control | Butadiene Containing Polymer |
|---|---|---|
| Glass Transition Temperature | 54.0° C. | 52.1° C. |
| Shimadzu Softening Point | 129° C. | 109° C. |
| Melt Flow Index at 150° C. | 3.5 | ≈1,000 |
| Number Average Molecular Weight | 56,200 | 8,850 |
| Weight Average Molecular Weight | 142,000 | 24,700 |
| Peak on GPC | 88,500 | 14,100 |

This experiment showed that both the number average and weight average molecular weight of the double bond containing polymer was decreased significantly by the ozone treatment. The ozone treatment also proved to increase the melt flow index of the polymer from about 3.5 to about 1,000. This represents an increase in melt flow index of over 250 fold. Even though the molecular weight and melt flow index of the polymer was changed drastically, its glass transition temperature and softening point remained relatively constant. Thus, the ozone treatment did not destroy the other critical characteristics of the resin.

While certain representative embodiments and details have been shown for the purpose of illustrating the subject invention, it will be apparent to those skilled in this art that various changes and modifications can be made therein without departing from the scope of the subject invention.

What is claimed is:

1. A process for preparing a low molecular weight which is particularly useful as a toner resin, which consists essentially of (1) treating an emulsion of a polymer having a number average molecular weight which is within the range of about 18,000 to about 60,000 and which is comprised of repeat units which are derived from about 65 to about 95 weight percent of a vinyl aromatic monomer, from about 1 to about 12 weight percent of a conjugated diene monomer, and optionally from about 1 to about 34 weight percent of an alkyl acrylate monomer, with ozone in an amount and under conditions which are sufficient to reduce the number average molecular weight of the polymer, wherein the ozone treatment is carried out in the absence of zinc; (2) monitoring the pH of the emulsion to determine the extent to which double bonds in the polymer have been cleaved; (3) continuing the ozone treatment until the number average molecular weight of the polymer has been reduced to within the range of about 3,000 to about 15,000; and (4) recovering the polymer from the emulsion.

2. A process as specified in claim 1 wherein the polymer in the emulsion has an initial number average molecular weight which is within the range of about 20,000 to about 30,000.

3. A process as specified in claim 1 wherein the polymer recovered has a number average molecular weight which is within the range of about 4,000 to about 12,000.

4. A process as specified in claim 3 wherein the vinyl aromatic monomer is styrene.

5. A process as specified in claim 4 wherein the alkyl acrylate monomer is n-butyl acrylate.

6. A process as specified in claim 5 wherein the conjugated diene monomer is 1,3-butadiene.

7. A process as specified in claim 6 wherein the polymer is comprised of repeat units which are derived from about 65 weight percent to about 90 weight percent styrene, from about 5 weight percent to about 34 weight percent n-butyl acrylate, and from about 1 weight percent to about 5 weight percent 1,3-butadiene.

8. A process as specified in claim 6 wherein the polymer is comprised of repeat units which are derived from about 70 weight percent to about 80 weight percent styrene, from about 16 weight percent to about 28 weight percent n-butyl acrylate, and from about 2 weight percent to about 4 weight percent 1,3-butadiene.

9. A process as specified in claim 6 wherein said polymer is comprised of repeat units which are derived from about 88 weight percent to about 92 weight percent styrene, and from about 8 weight percent to about 12 weight percent 1,3-butadiene.

10. A process as specified in claim 6 wherein said polymer is comprised of repeat units which are derived from about 85 weight percent to about 95 weight percent styrene and from about 5 weight percent to about 15 weight percent 1,3-butadiene.

11. A process as specified in claim 6 wherein the polymer recovered has a number average molecular weight which is within the range of about 4,000 to about 12,000.

12. A process as specified in claim 6 wherein the polymer recovered has a number average molecular weight which is within the range of about 3,000 to about 15,000.

13. A process as specified in claim 1 wherein the process is carried out at a temperature which is within the range of about 0° C. to about 60° C.

14. A process as specified in claim 1 wherein said process is carried out at a temperature which is within the range of about 15° C. to about 30° C.

15. A process as specified in claim 1 wherein the ozone treatment is carried out for a period of time which is within the range of about 15 minutes to about 6 hours.

16. A process as specified in claim 1 wherein the polymer recovered has a glass transition temperature which is within the range of about 40° C. to about 65° C.

17. A process as specified in claim 6 wherein the polymer recovered has a glass transition temperature which is within the range of about 45° C. to about 60° C.

* * * * *